May 26, 1925.
U. STEINER
1,538,958
VALVE LATHE
Filed March 22, 1922   2 Sheets-Sheet 1
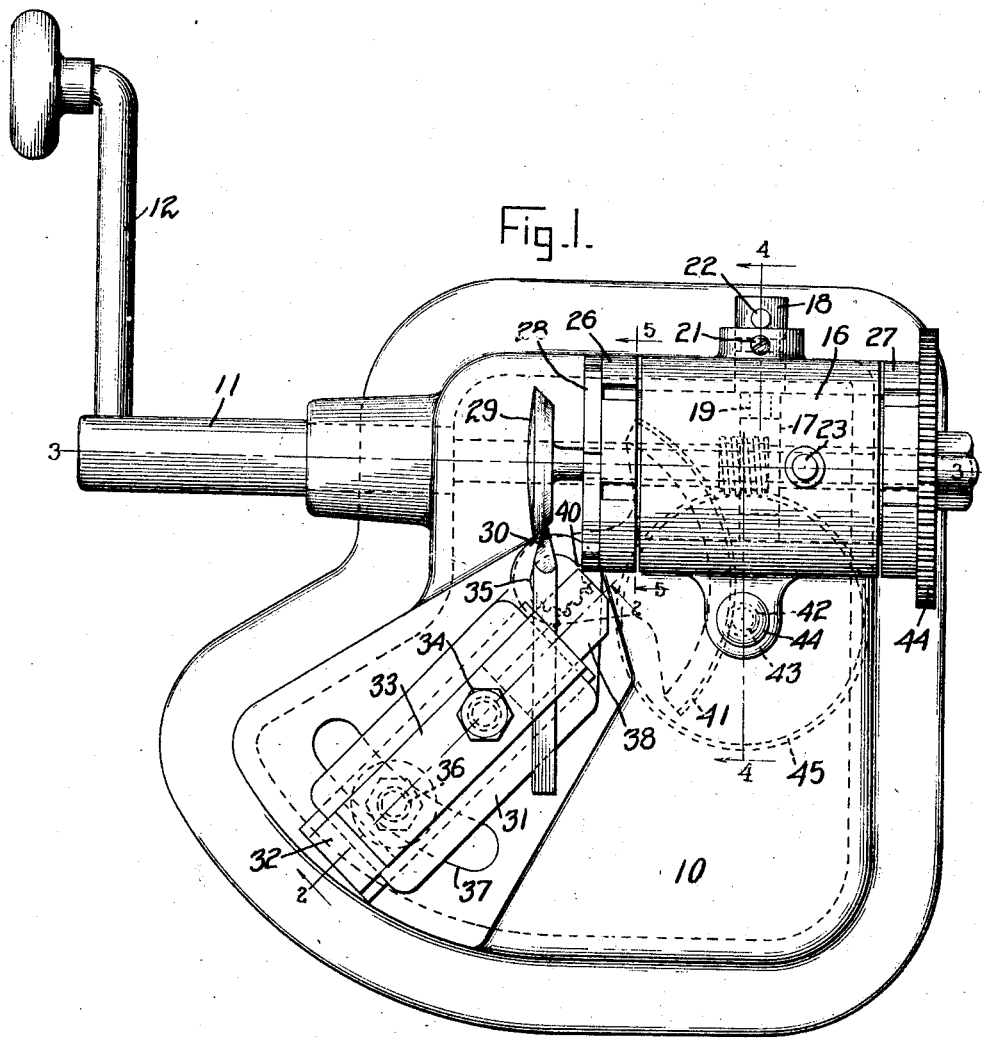
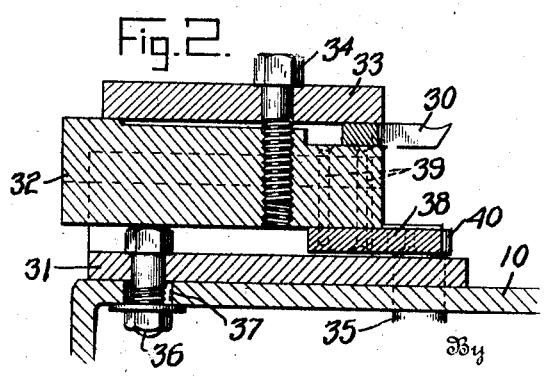
Inventor
Ulrich Steiner
Attorney May 26, 1925.
U. STEINER
1,538,958
VALVE LATHE
Filed March 22, 1922    2 Sheets-Sheet 2
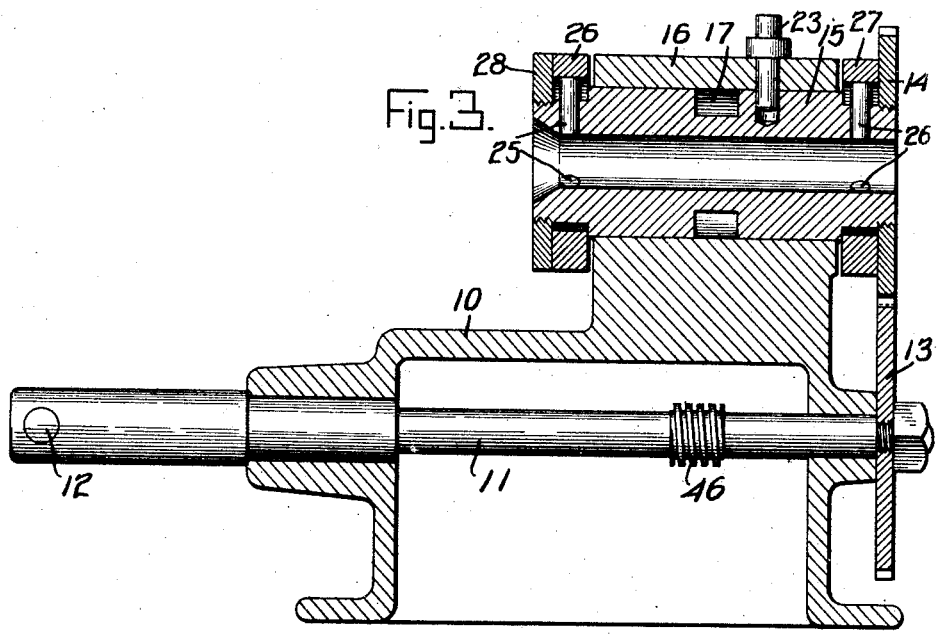
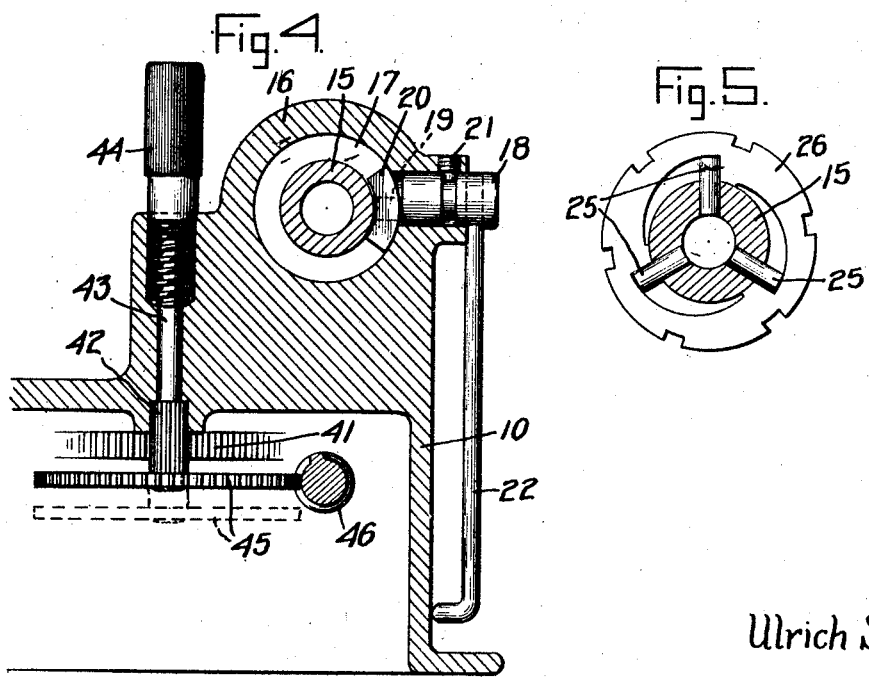
Inventor
Ulrich Steiner
Attorney Patented May 26, 1925.

1,538,958

UNITED STATES PATENT OFFICE.

ULRICH STEINER, OF LIMA. OHIO, ASSIGNOR TO STEINER BROTHERS, OF LIMA, OHIO, A PARTNERSHIP.

VALVE LATHE.

Application filed March 22, 1922. Serial No. 545,725.

*To all whom it may concern:*

Be it known that I, ULRICH STEINER, a citizen of the United States, residing at Lima, in the county of Allen and State of Ohio, have invented certain new and useful Improvements in Valve Lathes, of which the following is a specification.

My said invention relates to a lathe for refacing valves of internal combustion engines when they become worn or distorted from heat, the machine being designed for use in service stations or repair shops where such work is done.

It is an object of the invention to provide a device of this character which shall be inexpensive, simple in construction and speedy in operation.

A further object is to provide a machine of the character described which can readily be adjusted for valves of different sizes.

Referring to the accompanying drawings which are made a part hereof and on which similar reference characters indicate similar parts, Figure 1 is a plan of the device, and Figures 2, 3, 4 and 5 are sections taken respectively on lines 2—2, 3—3, 4—4, and 5—5 of Figure 1.

In the drawings reference character 10 indicates the base of the machine, this base having bearings in which is mounted a shaft 11 which is the main shaft of the machine and is driven by a crank 12. At its end remote from the crank the shaft has a gear 13 meshing with a gear 14 on a work carrying spindle 15. The work carrying spindle is located in an upper bearing 16 on the base of the machine and has an annular recess 17 approximately midway of its length. A rock shaft 18 located in a bearing extending laterally from the bearing 16 has an eccentric pin 19 engaging a shoe 20 located in the recess 17. The rock shaft is held in place by a screw 21 engaging a groove therein and a handle 22 is fixed to the rock shaft to move the spindle lengthwise in the bearing. This handle is preferably resilient and presses against the base with its bent end to hold the spindle 15 in adjusted position.

The spindle 15 also has an opening adjacent the recess 17 for engagement by a locking pin 23 whereby the entire machine may be held against operation by the crank. This is for the purpose of enabling the operative to hold the spindle against rotation while locking a valve stem in place in the spindle or releasing it therefore. When the spindle is to be free the pin 23 is inverted, the short end being too short to reach the spindle. For fixing the valve-stem in place the spindle is provided with two sets of pins 24 and 25 actuated respectively by cam rings 26 and 27, one of which is held between the shoulder on spindle 15 and the gear 14 and the other between the shoulder of the opposite end of the spindle 15 and a face plate 28. The spindle being locked in place by pin 23 and the cam ring being turned to the position shown in Figure 5, a valve stem carrying a valve 29 may be inserted in the opening and locked in place by rotation of the cam rings, after which the handle 22 may be moved to move the valve 29 toward and from the tool 30.

The tool 30 is a cutting tool and is mounted on a pivoted tool holder 31 having a pair of jaws 32 and 33 constituting a slidable tool holder or tool slide. The upper jaw is movable toward the lower jaw to engage the tool and the two jaws are fixed together by a screw 34. The tool holder 31 has pivotal engagement at its forward end with a shaft 35 and is held in adjusted position at its rear end by a bolt 36 movably mounted in a slot 37. By this means the tool holder may be located according to the angle of the face of the valve, the tool being also capable of adjustment toward and from the valve independently of the holder.

For traversing the tool relatively to the valve during the refacing operation I have provided the following mechanism. A rack bar 38 is secured to the lower jaw 32 as by rivets 39 or if desired may be made integral therewith. This rack bar is engaged by the teeth of a pinion 40 on or integral with the shaft 35. This shaft carries a rack segment 41 shown in dotted lines in Figure 1 and said segment engages with the teeth of a pinion 42 on a vertical shaft 43 having at its upper end a handle 44. A spring located in a recess of the base surrounds the shaft 43 and bears against the lower end of the handle 44 or against the collar underneath the same. At its lower end the shaft 43 carries a gear 45 normally engaged with a worm 46 on the shaft 11.

A valve being located in the position shown in Figure 1 and the tool holder and tool being also adjusted as shown, the crank 12 is turned to drive the spindle 15 and so rotate the valve. At the same time through the train of gearing formed by the worm 46, gear 45, shaft 43, pinion 42, segment rack 41, shaft 35, pinion 40, and rack 38 the toolslide is traversed in a direction parallel to the face of the valve. When a cut has been completed across the face of the valve the shaft 43 is depressed by pressure of the handle 44 to disengage the worm gear 45 from worm 46, the worm gear assuming the dotted line position indicated in Figure 4. With the parts in this position the handle may be turned to restore the tool slide to its original position when the downward pressure on handle 44 being relieved the worm gear will again mesh with the worm so as to be driven thereby.

It will be obvious to those skilled in the art that many changes may be made in my device without departing from the spirit of my invention, the true scope of which is indicated in the appended claims.

Having thus fully described my said invention, what I claim as new and desire to secure by Letters Patent, is:

1. A valve lathe comprising a work holder, a tool slide for moving the tool across the face of a valve, a holder supporting said tool slide, said holder being pivotally adjustable to vary the path of the tool slide, means whereby the work holder may be moved axially to move the valve toward and away from the path of the tool, common driving means for rotating the work holder and moving the tool slide in one direction, and manual means for resetting the tool slide, substantially as set forth.

2. A valve lathe comprising a hollow spindle, a bearing therefor, said spindle having an annular recess, a shoe in said recess, a lateral bearing communicating with said first-named bearing, a rockshaft in said lateral bearing, an eccentric pin therein adapted to engage said shoe to move said spindle longitudinally and means for moving the rockshaft, substantially as set forth.

3. A valve lathe comprising means for rotatably supporting a valve, a tool holder pivotally mounted adjacent thereto, means for locking said tool holder in adjusted position, a tool slide on the holder, rack teeth on the slide, a shaft adjacent to the path of the tool slide having teeth to engage said rack teeth and means for oscillating said shaft to move said tool slide parallel with the face of the valve, substantially as set forth.

4. A valve lathe comprising means for rotatably supporting the valve, a tool holder pivotally mounted adjacent thereto, means for locking said tool holder in adjusted position, a tool slide on the holder, rack teeth on the slide, a shaft adjacent to the path of the tool slide having teeth to engage said rack teeth, and means for oscillating said shaft to move said tool slide parallel with the face of the valve including a rack segment fixed to the shaft, a broad faced pinion engaging said rack, and means for driving the broad faced pinion either manually or under power, substantially as set forth.

5. A valve lathe comprising means for rotatably supporting the valve, a tool holder pivotally mounted adjacent thereto, means for locking said tool holder in adjusted position, a tool slide on the holder, rack teeth on the slide, a shaft adjacent to the path of the tool slide having teeth to engage said rack teeth, and means for oscillating said shaft to move said tool slide parallel with the face of the valve including a rack segment fixed to the shaft, a broad faced pinion engaging said rack, and means for driving the broad faced pinion either manually or under power, said pin having a collar to limit its movement and projecting unequally in opposite directions from the collar, substantially as and for the purpose set forth.

6. In a valve lathe, a work holder for a valve stem, a shaft journaled at right angles to the work holder, connections between the shaft and the workholder, and means whereby the shaft may be rocked to move the workholder axially, substantially as set forth.

7. In a valve lathe, a work holder for a valve stem, means spaced axially along the work-holder for securely holding said valve stem, a shaft journaled at right angles to the work holder, connections between the shaft and the workholder, and means whereby the shaft may be rocked to move the workholder axially, substantially as set forth.

8. A valve lathe comprising a rotatable work holder, a traversing tool slide, a tool thereon, a main shaft, and gearing connected to the main shaft for rotating the work holder and traversing the tool slide in one direction including a worm on the main shaft, a worm wheel normally engaging the worm for driving the tool slide, and manual means for disengaging the worm and the worm wheel, substantially as set forth.

9. A valve lathe comprising a rotatable workholder, a traversing tool slide, a rack thereon, a pinion engaging the rack, a shaft carrying the pinion and forming the pivot about which the tool slide may be adjusted to vary the relative positions of the tool and the work, and means for rotating the workholder and traversing the tool holder in a line parallel to the face of the work, substantially as set forth.

10. A valve lathe comprising a rotary workholder, a tool slide for moving a tool across a face of a valve, a holder supporting said tool slide, means for driving the workholder and the tool slide including a shaft about which the workholder is pivotally adjustable to vary the path of the tool slide, and means whereby the valve may move forward and away from the path of the tool, substantially as set forth.

11. A valve lathe comprising a workholder, a traversing tool slide, a rack on the tool slide, a pinion engaging the rack, a shaft carrying the pinion and forming a pivot about which the tool slide may be adjusted to vary the relative positions of the tool and the work, a main shaft, and gearing connected thereto for driving the workholder and the pinion, substantially as set forth.

12. In a valve lathe, a hollow rotary workholding spindle, a fixed bearing for the spindle, means for driving the spindle, means for centering a valve stem and clamping it in place in the spindle including circumferential rows of radial pins spaced axially along the spindle, cam rings rotatable about the spindle to move the pins toward and from the spindle, and means for holding the spindle against rotation including a pin adapted to be positioned loosely in registering holes in the spindle and bearing said pin being normally disengaged from the spindle, substantially as set forth.

In witness whereof, I have hereunto set my hand and seal at Lima, Ohio, this 17th day of March, A. D. nineteen hundred and twenty-two.

ULRICH STEINER. [L. s.]

Witnesses:
 H. E. MEYERS,
 R. P. DAY.